(12) United States Patent
Passrucker et al.

(10) Patent No.: US 9,316,103 B2
(45) Date of Patent: Apr. 19, 2016

(54) BLADING

(71) Applicant: MTU Aero Engines GmbH, Munich (DE)

(72) Inventors: Harald Passrucker, Munich (DE); Roland Wunderer, Unterschleißheim (DE)

(73) Assignee: MTU AERO ENGINES GmbH, Munich (DE)

( * ) Notice: Subject to any disclaimer, the term of this patent is extended or adjusted under 35 U.S.C. 154(b) by 632 days.

(21) Appl. No.: 13/683,647

(22) Filed: Nov. 21, 2012

(65) Prior Publication Data

US 2013/0136619 A1 May 30, 2013

(30) Foreign Application Priority Data

Nov. 25, 2011 (EP) .................................. 11190851

(51) Int. Cl.
*F04D 29/54* (2006.01)
*F01D 5/14* (2006.01)

(52) U.S. Cl.
CPC ............... *F01D 5/145* (2013.01); *F01D 5/143* (2013.01); *F04D 29/544* (2013.01); *Y02T 50/673* (2013.01); *Y10T 29/49336* (2015.01)

(58) Field of Classification Search
CPC ....... F01D 5/143; F01D 5/145; F04D 29/544; F04D 29/547
USPC ........................................................ 416/235
See application file for complete search history.

(56) References Cited

U.S. PATENT DOCUMENTS

| 6,017,186 | A  | * | 1/2000 | Hoeger et al. | 415/181 |
| 6,283,713 | B1 | * | 9/2001 | Harvey et al. | 416/193 A |
| 2007/0258810 | A1 | * | 11/2007 | Aotsuka et al. | 415/206 |
| 2007/0258818 | A1 |   | 11/2007 | Allen-Bradley et al. | |
| 2008/0267772 | A1 | * | 10/2008 | Harvey et al. | 415/191 |
| 2010/0303627 | A1 | * | 12/2010 | Megerle et al. | 416/179 |
| 2011/0044818 | A1 |   | 2/2011 | Kuhne et al. | |
| 2011/0189023 | A1 | * | 8/2011 | Guimbard et al. | 416/223 R |
| 2013/0017080 | A1 | * | 1/2013 | Tham et al. | 415/208.1 |

FOREIGN PATENT DOCUMENTS

| DE | 3202855 C1 | 3/1983 |
| EP | 0997612 A2 | 5/2000 |
| EP | 1995410 A1 | 11/2008 |
| EP | 2248966 A1 | 11/2010 |

(Continued)

OTHER PUBLICATIONS

Atkins M. J., "Secondary Losses and End-Wall Profiling in a Turbine Cascade", IMechE Conference on Turbomachinery: Efficiency Prediction and Improvement, xx, xx, Bd. 6, 1. Jan. 1, 1987, Seiten 29-42, XP001012087, Absatz [05.3]; Abbildungen 5, 7.

(Continued)

*Primary Examiner* — Christopher Verdier
(74) *Attorney, Agent, or Firm* — Barlow, Josephs & Holmes, Ltd.

(57) ABSTRACT

A blading for a turbomachine, particularly for a gas turbine, wherein thickened areas and depressions formed and disposed on a lateral wall having a plurality of blades such that at least one depression is disposed on a blade pressure side and at least one thickened area is disposed on a blade suction side for each blade of the plurality of blades.

10 Claims, 3 Drawing Sheets

(56) References Cited

FOREIGN PATENT DOCUMENTS

| | | | |
|---|---|---|---|
| EP | 2261462 | A1 | 12/2010 |
| EP | 2458148 | A1 | 5/2012 |
| EP | 2589752 | A2 | 5/2013 |
| WO | 2011039352 | A2 | 4/2011 |

OTHER PUBLICATIONS

Inventecs Patentingenieure, "Recherchebericht mit einer Kurdarstellung der ermittelten Dokumente", Vorrecherche zum Stand der Technik, Umfangskonturierte Seitenwand in Turbomaschinen, p. 807797 Jun. 16, 2011.

Atkins, M. J., "Secondary losses and end-wall profiling in a turbine cascade", XP-001012087, C255/87@IMechE 1987.

* cited by examiner

BLADING

BACKGROUND AND SUMMARY OF THE INVENTION

The invention relates to a blading for a turbomachine, in particular an internal combustion engine having at least one compressor stage, combustion chamber and turbine stage, preferably a gas turbine in which thickened areas and depressions are formed on a lateral wall having a plurality of blades, and a manufacturing method for such a blading.

A blade passage of a turbomachine is generally defined by a hub-side and a housing-side lateral wall as well as guide vanes or rotating blades disposed therebetween, each of the lateral walls being able to be fixed relative to the hub or housing. Increased deflections of the flow may occur in blade passages due to the effect of wall friction in the region of the lateral walls, whereby in part strongly pronounced secondary flows result. These secondary flows cause increased losses.

A blading for a turbine is known from EP 1 995 410 A1, in which thickened areas and depressions are formed on a lateral wall having a plurality of blades. Bladings for turbines or turbomachines are known from EP 2 248 966 A1 and DE 32 02 855 C1, in which elevations are formed on a lateral wall having a plurality of blades.

The object of the present invention is to provide an improved blading and a method for the manufacture thereof.

This object is achieved by a blading with at least one depression disposed on a blade pressure side and at least one thickened area disposed on a blade suction side for each blade of the plurality of blades, as well as by a manufacturing method for a blading wherein the blade has a bent, particularly orthogonal transition in the region of the transition from blade to lateral wall. Advantageous enhancements are the subject of the dependent claims.

According to one aspect of the present invention, in the case of a blading for a turbomachine, in particular a compressor stage or turbine stage of an internal combustion engine, preferably a gas turbine, in which thickened areas and depressions are formed on a lateral wall having a plurality of blades, for each blade of the plurality of blades, at least one depression is disposed on the pressure side of the blade and at least one thickened area is disposed on the suction side of the blade.

By this targeted combined introduction of thickened areas and depressions on the pressure or suction sides, respectively, an advantageous local adaptation of the static pressure and the flow velocity can be achieved, whereby secondary flows can be influenced advantageously and flow losses can be reduced. In addition to the reduction in losses in the blade channels over a large operating range of turbomachines, another advantage of this configuration also may lie in an enlarging of the operating range of turbomachines. An advantage may also lie in a simple structural conversion and/or applicability for already existing designs of turbomachines.

As blading in the sense of the present invention, an arrangement of rotating blades and/or an arrangement of guide vanes, in particular of one or more stages, is particularly intended. A blading according to the invention is particularly suitable for high-pressure compressors. In a preferred embodiment, an aircraft engine has a blading according to the invention.

A lateral wall in the sense of the present invention can be on the hub or rotor side, and/or the housing side and can be fixed on the hub or rotor, and/or the housing. Thus, a lateral wall may comprise the hub-side, i.e., radially inner and hub-fixed peripheral face of a rotating-blade grid, and/or the housing-side, i.e., radially outer peripheral face of a rotating-blade grid, which can be formed, in particular, by a shroud fixed to the hub or by an inner face fixed to the housing. Likewise, a lateral wall may comprise the housing-side, radially outer peripheral face and/or the hub-side peripheral face of a guide-vane grid, which can be formed, in particular, by a shroud fixed on the housing or an outer face fixed on the hub.

In the sense of the present invention, a depression is to be understood particularly to be a region of the lateral wall that is offset radially inwardly relative to other regions of the lateral wall, while a thickened area or elevation in the sense of the present invention is to be understood particularly to be a region of the lateral wall that is offset radially outwardly relative to other regions of the lateral wall. A depression or thickened area in the sense of the present invention may be recessed or extended radially inwardly or outwardly, respectively, in particular, in relation to a particularly straight or curved reference conical surface that lies concentrically to an axis of rotation. The reference conical surface, in particular, can run through the radially innermost or radially outermost points of the lateral wall or therebetween. In particular, the radius of the reference conical surface may correspond to the average of the maximum and minimum or all radial extensions of the lateral wall. In addition, the depression or thickened area may also relate to a reference conical surface that runs through a non-contoured region of the lateral wall or a root or a tip of the blades.

In the sense of the present invention, a thickened area can be understood, in particular, as a radial dimension that is larger in comparison to the depression, while a depression is understood correspondingly as a radial dimension that is smaller in comparison to the thickened area.

For example, if one considers a sinusoidally channeled lateral wall in the peripheral direction, then the mountains or valleys represent thickened areas or depressions, respectively, relative to the central line, in the sense of the present invention. Likewise, one can proceed from a reference conical surface through the radially maximum or minimum amplitudes of the sinusoidally channeled lateral wall. Here also, the valleys represent depressions and the mountains represent thickened areas relative to this reference conical surface, since they lie in contrast radially further in (or further out).

The lateral wall is preferably not contoured in the axial direction in front of and/or behind the pressure-side depressions and/or suction-side thickened areas, i.e., it has the same radius over the entire circumference of a radial section.

In a preferred embodiment, a depression disposed in the region of the pressure side of the blade and/or a thickened area disposed in the region of the suction side of the blade, viewed in the direction of flow, begins in front of or in back of the leading edge of the blade.

A depression disposed in the region of the blade's pressure side and/or a thickened area disposed in the region of the blade's suction side in the axial direction preferably extends over at least 10%, preferably at least 30%, of the axial grid length, measured between the leading and trailing edges of the blade.

In a preferred embodiment for the blading, the thickened area disposed in the blade's suction side and/or the depression disposed in the blade's pressure side is (are) disposed in the axial half of the blade grid adjacent to or facing the inlet side.

A second thickened area in the half adjacent to the outlet side is preferably disposed extending in each case from the blade's suction side to the blade's pressure side, for the blading. In this configuration, the second thickened area can be disposed and configured peripherally symmetrical. Alternatively, the second thickened area can be disposed and configured peripherally asymmetrical. The second thickened area can extend preferably in the peripheral direction from one blade to the adjacent blade. In the axial direction, the second thickened area can extend over at least 10% of the axial grid length in a preferred embodiment. The second thickened area can be radially higher or lower than the thickened area disposed on the suction side of the blade.

The present invention can preferably be applied in blade grids that have a bent, particularly at least substantially orthogonal, transition from the blade's pressure side and/or suction side to the lateral wall; likewise also in the case of blade grids that have a rounded root area in the transition region from the blade's pressure side and/or suction side to the lateral wall.

According to another aspect of the present invention relating to the manufacturing method, in the case of a manufacturing method for a blading for a turbomachine, at least one original shaping, reshaping and/or cutting treatment is executed in such a way that in the case of a lateral wall having a plurality of blades, thickened areas and depressions are formed, at least one depression being formed on a blade's pressure side and at least one thickened area being formed on a blade's suction side for each blade of the plurality of blades.

Advantageously, a blading having a high efficiency, particularly in a rapidly rotating high-pressure compressor (stage) can be provided by the configuration according to the invention.

BRIEF DESCRIPTION OF THE DRAWING FIGURES

Further advantages and features result from the dependent claims and the examples of embodiment. Shown for this purpose, partially schematized, are the following drawing figures:

DETAILED DESCRIPTION OF AN EXEMPLARY EMBODIMENT

Figure 1:
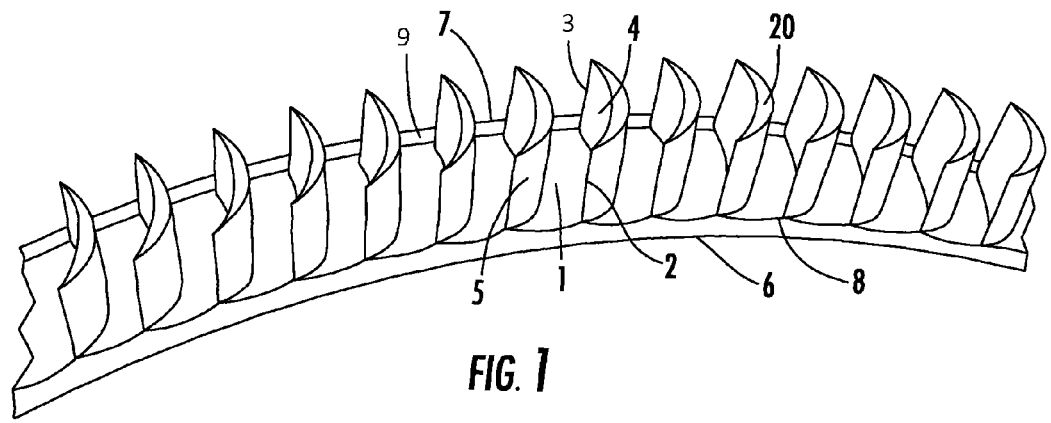
FIG. 1 is a perspective representation of a blading according to the invention.

FIG. 1 shows a perspective representation of a blading for a turbomachine with a contouring of a hub-side lateral wall 1 for a compressor stator grid in the hub region, the housing wall not being depicted in FIG. 1. A plurality of blades 20 with a blade leading edge 2, a blade trailing edge 3, a blade pressure side 4 and a blade suction side 5 are disposed on lateral wall 1, whereby lateral wall 1 can preferably have a non-contoured region 8 at the grid inlet and a non-contoured region 9 at the grid outlet. In addition, the inlet edge 6 on the blade root and the outlet edge 7 on the blade root can be recognized in FIG. 1.

Figure 2:
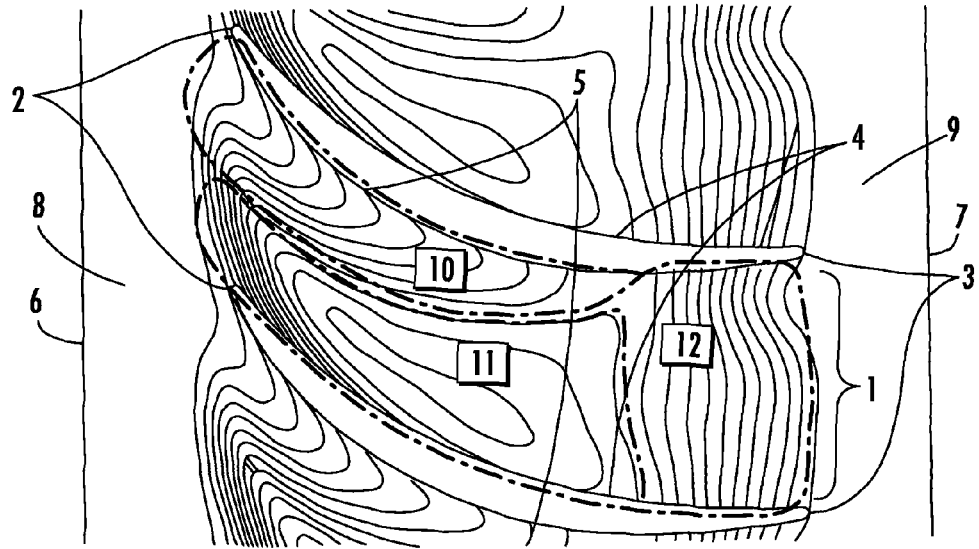
FIG. 2 is a contour diagram of the contouring of a lateral wall for a first example of embodiment of the present invention in one execution.

FIG. 2 shows a representation of the contouring of lateral wall 1 for a first example of embodiment of the blading in a contour diagram, in which blades 20 do not have a rounded root surface and in which the isolines of the extent of the lateral-wall contour are shown in the direction orthogonal to the lateral wall. A depression 11 is disposed on blade pressure side 4 and a thickened area 10 is disposed on blade suction side 5. According to a preferred example of embodiment, this thickened area 10 can be formed by an elevation. According to another preferred example of embodiment, this thickened area 10 can be formed by a depression that is markedly smaller relative to depression 11. Preferably, a second thickened area 12, which extends from the blade suction side 5 to the blade pressure side 4 is disposed in the half adjacent to the outlet side.

Figure 3:
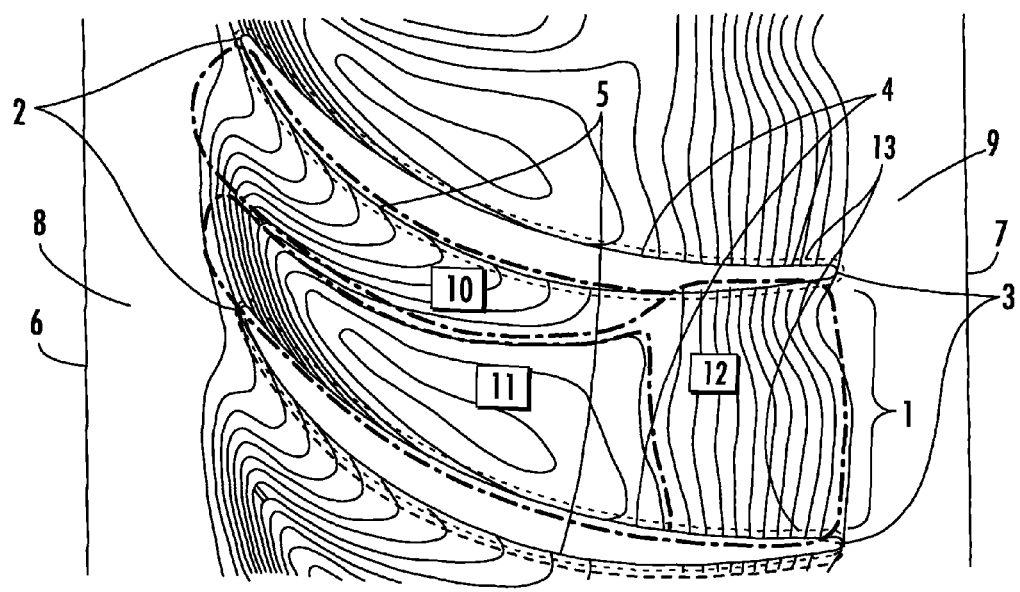
FIG. 3 is a contour diagram of the contouring of a lateral wall for a second example of embodiment of the present invention in a representation corresponding to FIG. 2.

FIG. 3 shows a representation of the contouring of lateral wall 1 for a second example of embodiment of the blading in a contour diagram, in which blades 20 have a rounded root surface, which is shown by the dashes in FIG. 3, and in which the isolines of the extent of the lateral-wall contour are shown in the direction orthogonal to the lateral wall. As in the example of embodiment shown in FIG. 2, the depression 11 is disposed on blade pressure side 4 and the thickened area 10 is disposed on blade suction side 5, and the second thickened area 12, which extends from the blade suction side 5 to the blade pressure side 4, is disposed in the half adjacent to the outlet side.

For illustration of the contouring in the case of different examples of embodiment, sectional views along the blade channel lengths are shown in the following, the sectional positions in the corresponding contour diagrams being shown in FIG. 4.

Figure 4:
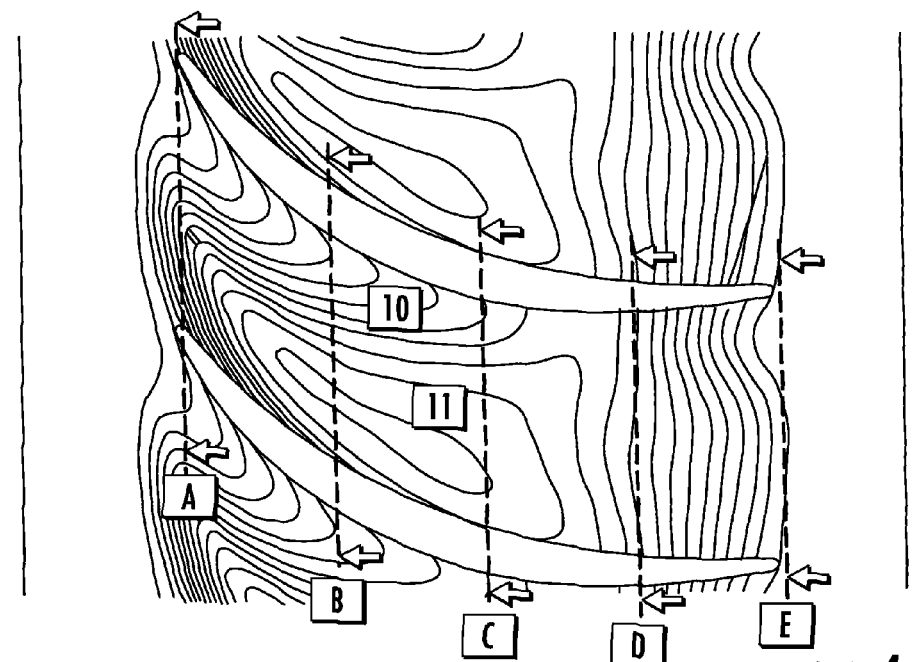
FIG. 4 is a representation corresponding to FIG. 2, in which positions of the sections of the subsequent figures are indicated.
Figure 5:
FIG. 5 is a series of sections along lines A, B, C, D and E in FIG. 4 for a first configuration of the blading.

FIG. 5 shows a representation of the blade walls and the hub-side lateral wall 1 from sections A, B, C, D and E in the sectional positions shown in FIG. 4 for a first configuration of the blading, which has a non-orthogonal transition of lateral wall 1 into blades 20 and no rounded root surface. The Sections A, B, C, D and E are described as follows:

A Section in the case of 1% blade channel length;
B Section in the case of 25% blade channel length;
C Section in the case of 50% blade channel length;
D Section in the case of 75% blade channel length; and
E Section in the case of 99% blade channel length.

Figure 6:
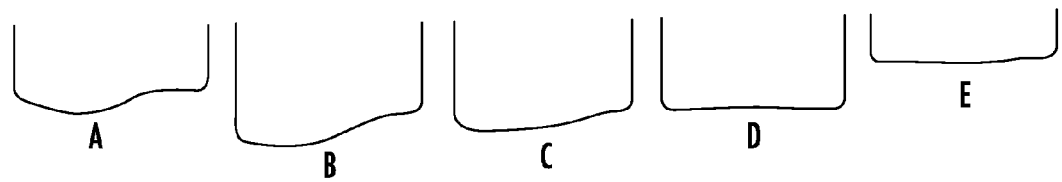
FIG. 6 is a series of sections along lines A, B, C, D and E in FIG. 4 for a second configuration of the blading.
Figure 7:
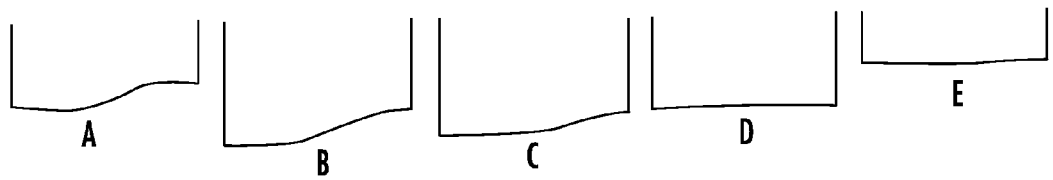
FIG. 7 is a series of sections along lines A, B, C, D and E in FIG. 4 for a third configuration of the blading.
Figure 8:
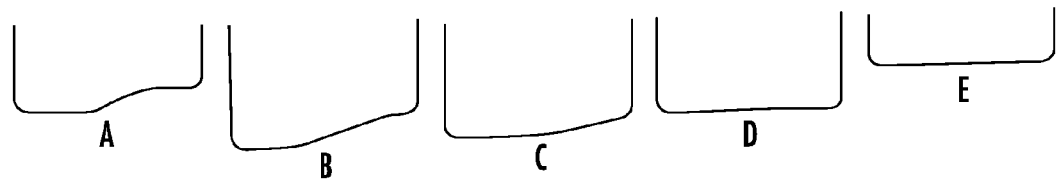
FIG. 8 is a series of sections along lines A, B, C, D and E in FIG. 4 for a fourth configuration of the blading.

FIG. 6 shows a representation of the blade walls and the hub-side lateral wall 1 from sections A, B, C, D and E in the sectional positions shown in FIG. 4 for a second configuration of the blading, which has a non-orthogonal transition of lateral wall 1 into blades 20 and rounded root surface 13. FIG. 7 shows a representation of the blade walls and the hub-side lateral wall 1 from sections A, B, C, D and E in the sectional positions shown in FIG. 4 for a third configuration of the blading, which has an orthogonal transition of lateral wall 1 into blades 20 and no rounded root surface. FIG. 8 shows a representation of the blade walls and the hub-side lateral wall 1 from sections A, B, C, D and E in the sectional positions shown in FIG. 4 for a fourth configuration of the blading, which has an orthogonal transition of lateral wall 1 into blades 20 and rounded root surface 13. The invention can also be applied in combinations of an orthogonal and a non-orthogonal transition, in which an orthogonal transition results on blade pressure side 4 or on blade suction side 5, whereas a non-orthogonal transition from lateral wall 1 to blade 20 results on the other of the two blade walls delimiting the flow channel.

What is claimed is:

1. A blading for a turbomachine in which a lateral wall has a plurality of blades, the blading comprising:

at least one depression disposed on a blade pressure side and at least one first thickened area disposed on a blade suction side for each blade of the plurality of blades; and a pair of adjacent blades selected from the blades;

a second thickened area extending from the respective blade suction side of a first one of the pair of blades to the respective blade pressure side on a second one of the pair of blades, the second thickened area being in a half of the blading adjacent to an outlet side;

wherein the second thickened area is defined by a plurality of isolines that measure a height of the lateral wall at a plurality of points on the lateral wall in a direction orthogonal to the lateral wall;

wherein each isoline of the second thickened area has a first end and a second end; the first end terminating at the respective suction side of the first one of the blades, and the second end terminating at the respective pressure side of the second one of the blades.

2. The blading according to claim 1, wherein the lateral wall is not contoured axially in front of and/or behind the first thickened areas and/or the at least one depression.

3. The blading according claim 1, wherein the at least one depression and/or the at least one first thickened area extends in an axial direction over at least 10% of an axial grid length, but no more than 100% of the axial grid length.

4. The blading according claim 3, wherein the depression and/or first thickened area extends in the axial direction over at least 30% of the axial grid length, but not more than 100% of the axial grid length.

5. The blading according to claim 1 wherein the at least one first thickened area disposed on the blade suction side and/or the at least one depression disposed on the blade pressure side is disposed in a half of the blade grid facing an inlet side.

6. The blading according to claim 1, wherein the second thickened area is peripherally symmetrical or peripherally asymmetrical.

7. The blading according claim 1 wherein each blade has a rounded root surface in a region of a transition from the respective blade to the lateral wall.

8. The blading according to claim 1 wherein each blade has a bent transition in a region of a transition from the respective blade to the lateral wall.

9. The blading according to claim 8 wherein the bent transition is orthogonal.

10. A manufacturing method for a blading of a turbomachine having at least one reshaping and/or at least one cutting treatment such that thickened areas and depressions are formed in a lateral wall having a plurality of blades, each blade having a respective pressure side and a respective suction side, comprising the steps of forming at least one depression selected from the depressions on the respective blade pressure side and forming at least one thickened area selected from the thickened areas on the respective blade suction side for each blade of the plurality of blades; and forming a second thickened area between a pair of adjacent blades selected from the plurality of blades so that the second thickened area extends from the respective blade suction side on a first one of the pair of blades to the respective blade pressure side on a second one of the pair of blades, the second thickened area being in a half of the blading adjacent to an outlet side;

wherein the second thickened area is defined by a plurality of isolines that measure a height of the lateral wall at a plurality of points on the lateral wall in a direction orthogonal to the lateral wall;

wherein each isoline of the second thickened area has a first end and a second end; the first end terminating at the respective suction side of the first one of the blades, and the second end terminating at the respective pressure side of the second one of the blades.

* * * * *